(12) United States Patent
Sahu et al.

(10) Patent No.: US 10,231,117 B2
(45) Date of Patent: Mar. 12, 2019

(54) SELECTIVE TUNING-AWAY IN MULTI-SUBSCRIPTION WIRELESS COMMUNICATION DEVICE

(71) Applicant: QUALCOMM Incorporated, San Diego, CA (US)

(72) Inventors: Debesh Kumar Sahu, Hyderabad (IN); Raja Chitikela, Hyderabad (IN); Vishnu Vardhan Kasilya Sudarsan, Hyderabad (IN); Tushar Gupta, Hyderabad (IN); Naresh Gundu, Hyderabad (IN); Bala Krishna Kotha, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 176 days.

(21) Appl. No.: 15/069,776

(22) Filed: Mar. 14, 2016

(65) Prior Publication Data

US 2017/0265114 A1 Sep. 14, 2017

(51) Int. Cl.
*H04W 8/18* (2009.01)
*H04L 29/06* (2006.01)
*H04W 48/18* (2009.01)
*H04W 60/00* (2009.01)
*H04W 60/06* (2009.01)

(52) U.S. Cl.
CPC ......... *H04W 8/183* (2013.01); *H04L 65/1006* (2013.01); *H04L 65/1016* (2013.01); *H04L 65/1069* (2013.01); *H04L 65/1073* (2013.01); *H04W 48/18* (2013.01); *H04W 60/005* (2013.01); *H04W 60/06* (2013.01)

(58) Field of Classification Search
CPC ..... H04W 36/14; H04W 8/183; H04W 36/36; H04W 48/18; H04W 60/005; H04W 60/06; H04W 88/06; H04L 65/1016; H04L 65/1073
See application file for complete search history.

(56) References Cited

U.S. PATENT DOCUMENTS

| 9,131,429 | B1 | 9/2015 | Bharadwaj et al. |
| 9,210,688 | B2 | 12/2015 | Kanamarlapudi et al. |
| 2006/0229094 | A1* | 10/2006 | Huh ..................... H04L 65/4061 455/518 |

(Continued)

FOREIGN PATENT DOCUMENTS

WO 2015180129 A1 12/2015

OTHER PUBLICATIONS

International Search Report and Written Opinion—PCT/US2017/019324—ISA/EPO—dated May 11, 2017.

*Primary Examiner* — Peter P Chau
(74) *Attorney, Agent, or Firm* — Paradice and Li LLP

(57) ABSTRACT

Embodiments described herein relate to a method of managing communications for a wireless communication device having a first Subscriber Identity Module (SIM) associated with a first subscription and a second SIM associated with a second subscription, the method including, but not limited to, determining that the first subscription is a Default Data Subscription (DDS), deactivating at least one first Packet Data Network (PDN) associated with the second subscription, and communicating via at least one second PDN associated with the second subscription, wherein the at least one first PDN is different from the at least one second PDN.

18 Claims, 6 Drawing Sheets

(56) References Cited

U.S. PATENT DOCUMENTS

| | | | |
|---|---|---|---|
| 2008/0014956 A1* | 1/2008 | Balasubrannanian | ........................ H04L 41/0806 455/452.1 |
| 2008/0117859 A1* | 5/2008 | Shahidi | ................. H04W 48/18 370/328 |
| 2011/0164566 A1* | 7/2011 | Xiong | ................. H04W 76/062 370/328 |
| 2013/0210484 A1 | 8/2013 | Jeenagala et al. | |
| 2013/0308620 A1* | 11/2013 | Bharadwaj | ............ H04W 40/02 370/338 |
| 2014/0016614 A1* | 1/2014 | Velev | ...................... H04W 4/70 370/331 |
| 2014/0064156 A1 | 3/2014 | Paladugu et al. | |
| 2014/0342735 A1* | 11/2014 | Liao | ........................ H04W 8/04 455/435.1 |
| 2015/0023217 A1* | 1/2015 | Hu | ...................... H04W 76/026 370/259 |
| 2015/0023230 A1* | 1/2015 | Hu | ...................... H04W 76/026 370/280 |
| 2015/0023258 A1* | 1/2015 | Hu | ...................... H04W 76/026 370/329 |
| 2015/0223077 A1* | 8/2015 | Fan | ...................... H04W 16/14 370/312 |
| 2015/0327207 A1 | 11/2015 | Bharadwaj | |

* cited by examiner

SELECTIVE TUNING-AWAY IN MULTI-SUBSCRIPTION WIRELESS COMMUNICATION DEVICE

BACKGROUND

A wireless communication device, such as a mobile phone device or a smart phone, may include two or more Subscriber Identity Modules (SIMs). Each SIM may enable at least one subscription via a Radio Access Technology (RAT). Such a wireless communication device may be a multi-SIM wireless communication device. In a Multi-SIM-Multi-Active (MSMA) wireless communication device (e.g., a Dual-SIM-Dual-Active (DSDA) device), all SIMs may be active at the same time. In a Multi-SIM-Multi-Standby (MSMS) wireless communication device (e.g., a Dual-SIM-Dual-Standby (DSDS) device), if any one SIM is active, then the rest of the SIM(s) may be in a standby mode. The RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network.

A DSDS wireless communication device may have two subscriptions associated with a same RAT, such as in an LTE-plus-LTE device. In this case, a first LTE subscription may be designated as a Default Data Subscription (DDS) for data services while a second LTE subscription may be utilized for multimedia services such as Voice-Over-LTE (VoLTE) over an Internet Protocol (IP) Multimedia Subsystem (IMS) Packet Data Networks (PDNs), Video Technology (VT), or Short Messaging Services (SMS). While the first subscription is active, the radio resources may be tuned away to the second subscription to respond to second-subscription pages. Even though the second subscription may be utilized for only IMS services, pages associated with other services (e.g., Internet services, data services, and the like) may not be distinguishable from pages associated with IMS services at reception of such pages, given that LTE pages are not classified. In other words, the wireless communication device cannot define the page type until the page has been received and decoded.

Thus, every time a page for the second subscription (the non-DDS subscription) is received from the network, the wireless communication device may 1) tune-away to the second subscription from the first subscription, 2) establish Radio Resource Control (RRC), 3) receive packets corresponding to the page for the second subscription, 4) decode the packets, and 5) determine if the packets are associated with VoLTE, VT, or SMS services. If the packets are not associated with VoLTE, VT, or SMS services, the packets may be disregarded. Therefore, second-subscription pages unrelated to VoLTE, VT, or SMS that trigger unnecessary tune-away and page-decoding processes may lead to a considerable waste of power and time. In addition, the first subscription may be suspended while such unnecessary processes occur, negatively impacting data throughput on the first subscription. In some instances, the tune-away time interval, being exceedingly lengthy, may cause the first subscription to be dropped, leading to negative user experience.

SUMMARY

Embodiments described herein relate to managing communications for a first subscription (e.g., a Default Data Subscription (DDS)) and a second subscription (e.g., a non-DDS) subscription in a Multi-SIM-Multi-Standby (MSMS) wireless communication device. To avoid decoding unrelated pages sent by the network for the second subscription, the wireless communication device may deactivate all Packet Data Networks (PDNs) other than a desired PDN by sending an indication message to the network associated with the second subscription. The desired PDN may be an Internet Protocol (IP) Multimedia Subsystem (IMS) PDN. The IMS PDN may enable IMS services such as, but not limited to, Rich Communication Services (RCS), File To Protocol (FTP) services, video sharing services, Voice-Over-LTE (VoLTE), Video Technology (VT), Short Messaging Services (SMS), and/or the like. In some embodiments, the wireless communication device may de-register IMS services other than one or more desired services (e.g., VoLTE, VT, and/or SMS services) so that the wireless communication device will not receive communications for the undesired services (e.g., RCS, FTP, video sharing services, and/or the like).

In some embodiments, a method of managing communications for a wireless communication device having a first SIM associated with a first subscription and a second SIM associated with a second subscription, the method including, but not limited to, determining that the first subscription is a DDS, deactivating at least one first PDN associated with the second subscription, and communicating via at least one second PDN associated with the second subscription, wherein the at least one first PDN is different from the at least one second PDN.

In some embodiments, deactivating the at least one first PDN associated with the second subscription includes sending a first indication message to a network of the second subscription indicating that the at least one first PDN associated with the second subscription is deactivated.

In various embodiments, the first indication message is an Over-the-Air (OTA) signaling message.

According to some embodiments, communicating via the at least one second PDN associated with the second subscription includes receiving pages for the at least one second PDN associated with the second subscription.

In various embodiments, the at least one first PDN associated with the second subscription is deactivated in response to determining that the first subscription is the DDS.

In some embodiments, the method further including determining that the second subscription is a non-DDS.

In some embodiments, the at least one first PDN associated with the second subscription is deactivated in response to determining that the second subscription is a non-DDS.

In various embodiments, the at least one first PDN includes an Internet PDN.

In some embodiments, the at least one second PDN includes an IMS PDN.

According to some embodiments, the method further includes de-registering at least one first service of the second PDN and communicating via at least one second service of the second PDN, wherein the at least one first service is different from the at least one second service.

In some embodiments, the at least one first service of the second PDN includes one or more of RCS, FTP services, or a non-mandatory service.

In some embodiments, the at least one second service of the second PDN includes one or more of VoLTE services, VT services, SMS services, or another mandatory service.

In some embodiments, de-registering the at least one first service of the second PDN includes sending a second indication message to a network of the second subscription indicating that the at least one first service associated with the second subscription is deactivated.

In various embodiments, the second indication message is an OTA signaling message.

In some embodiments, communicating via at least one second service of the second PDN includes receiving Session Initiation Protocol (SIP) packets for the at least one second service.

In some embodiments, the first subscription is a LTE subscription. The second subscription is a LTE subscription.

In some embodiments, the wireless communication device is a MSMS device.

According to various embodiments, the method further includes not communicating via the at least one first PDN associated with the second subscription.

According to some embodiments, a wireless communication device includes at least one radio frequency (RF) resource, a processor configured to connect to a first SIM associated with a first subscription and to a second SIM associated with a second subscription, and configured to determine that the first subscription is a DDS, deactivate at least one first PDN associated with the second subscription, and communicate via at least one second PDN associated with the second subscription, wherein the at least one first PDN is different from the at least one second PDN, and a memory.

In some embodiments, the processor is configured to deactivate the at least one first PDN associated with the second subscription by sending a first indication message to a network of the second subscription indicating that the at least one first PDN associated with the second subscription is deactivated.

In various embodiments, the first indication message is an OTA signaling message.

In some embodiments, the processor is configured to communicate via the at least one second PDN associated with the second subscription by receiving pages for the at least one second PDN associated with the second subscription.

In some embodiments, the at least one first PDN includes an Internet PDN.

In various embodiments, the at least one second PDN includes an IMS PDN.

In some embodiments, the processor is further configured to de-register at least one first service of the second PDN and communicate via at least one second service of the second PDN, wherein the at least one first service is different from the at least one second service.

In various embodiments, the at least one first service of the second PDN includes one or more of RCS or FTP services. The at least one second service of the second PDN includes one or more of VoLTE services, VT services, or SMS services.

In some embodiments, the processor is configured to de-register the at least one first service of the second PDN by sending a second indication message to a network of the second subscription indicating that the at least one first service associated with the second subscription is deactivated.

In some embodiments, the second indication message is an OTA signaling message.

In various embodiments, a method of managing communications for a wireless communication device having a first SIM associated with a first subscription and a second SIM associated with a second subscription, the method including determining that the first subscription is a DDS, de-registering at least one first service of a PDN associated with the second subscription, and communicating via at least one second service of the PDN associated with the second subscription, wherein the at least one first service is different from the at least one second service.

In various embodiments, a wireless communication device includes at least one radio frequency (RF) resource, a processor configured to connect to a first SIM associated with a first subscription and to a second SIM associated with a second subscription, and configured to determine that the first subscription is a DDS, de-register at least one first service of a PDN associated with the second subscription, and communicate via at least one second service of the PDN associated with the second subscription, wherein the at least one first service is different from the at least one second service, and a memory.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Figure 1:
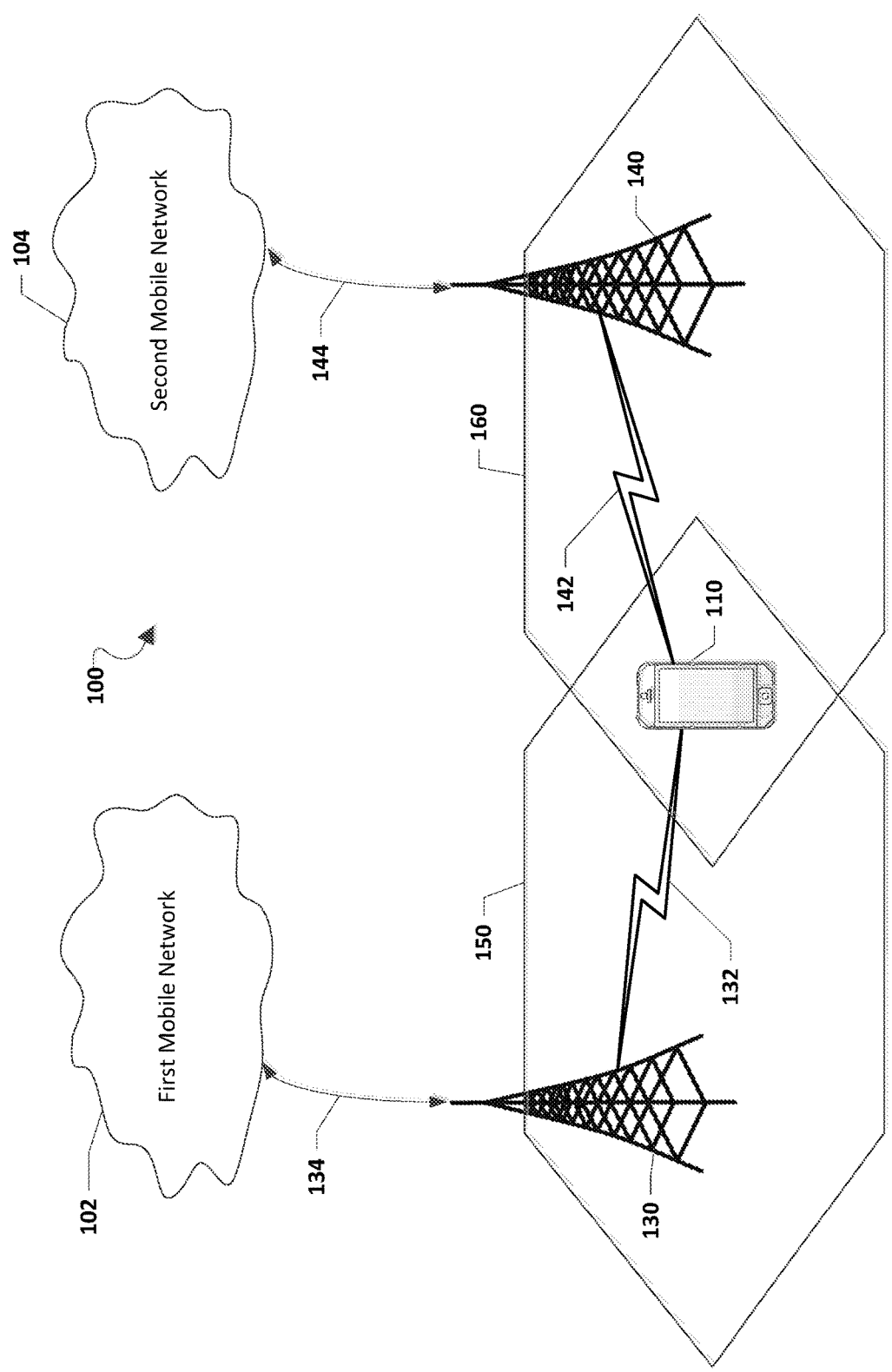
FIG. 1 is a schematic diagram of a communication system in accordance with various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Some modern communication devices, referred to herein as a wireless communication device, User Equipment (UE), or Mobile Station (MS), may include any one or all of cellular telephones, smart phones, personal or mobile multimedia players, personal data assistants, laptop computers, personal computers, tablet computers, smart books, palmtop computers, wireless electronic mail receivers, multimedia Internet-enabled cellular telephones, wireless gaming controllers, and similar personal electronic devices. Such a wireless communication device may include at least one Subscriber Identity Module (SIM), a programmable processor, memory, and circuitry for connecting to two or more mobile communication networks.

A wireless communication device may include one or more SIMs that provide users of the wireless communication devices with access to one or multiple separate mobile communication networks. The mobile communication networks may be supported by Radio Access Technologies (RATs). The wireless communication device may be configured to connect to one or more base stations via one or more RATs. Examples of RATs may include, but not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network. Each RAT may be associated with a subscription or SIM.

A wireless communication device provided with a plurality of SIMs and connected to two or more subscriptions or networks with one subscription or network being active at a given time is a Multi-SIM-Multi-Standby (MSMS) communication device. In one example, the MSMS communication device may be a Dual-SIM-Dual-Standby (DSDS) communication device, which may include two SIMs that may both be active on standby, but one is deactivated when the other one is in use. In another example, the MSMS communication device may be a Triple-SIM-Triple-Standby (TSTS) communication device, which includes three SIMs that may all be active on standby, where two may be deactivated when the third one is in use. In other examples, the MSMS communication device may be other suitable multi-SIM communication devices, with, for example, four or more SIMs, such that when one is in use, the others may be deactivated.

On the other hand, a wireless communication device that includes a plurality of SIMs and connects to two or more subscriptions or networks with two or more subscriptions or networks being active at a given time may be a MSMA communication device. An example MSMA communication device may be a Dual-SIM-Dual-Active (DSDA) communication device, which may include two SIM. Both SIMs may remain active. In another example, the MSMA device may be a Triple-SIM-Triple-Active (TSTA) communication device, which may include three SIM. All three SIMs may remain active. In other examples, the MSMA communication device may be other suitable multi-SIM communication devices with four or more SIMs, all of which may be active.

Generally, embodiments described herein may be applicable to a MSMS wireless communication device having at least a first SIM and a second SIM. Illustrating with a non-limiting example, the first SIM may be associated with a first subscription via a first RAT, and the second SIM may be associated with a second subscription via a second RAT. In some embodiments, the first RAT and the second RAT may be the same. Illustrating with a non-limiting example, the first RAT and the second RAT may be LTE. The embodiments may also be applicable to a MSMA wireless communication device that halts first subscription communication activities when the second subscription receives pages or other types of communication due to blanking pattern, power back-off, interference, and/or the like.

As used herein, the terms "SIM," "SIM card," and "subscriber identification module" may be used interchangeably to refer to a memory that may be an integrated circuit or embedded into a removable card, and that stores an International Mobile Subscriber Identity (IMSI), related key, and/or other information used to identify and/or authenticate a wireless device on a network and enable communication services with the network. Because the information stored in a SIM may be the wireless device to establish a communication link for a particular communication service with a particular network, the term "SIM" may also be used herein as a shorthand reference to the communication service (e.g., the networks, the subscriptions, the services, and/or the like) associated with and enabled by the information (e.g., in the form of various parameters) stored in a particular SIM as the SIM and the communication network, as well as the services and RATs supported by that network, correlate to one another.

Embodiments described herein relate to intelligently scheduling communication for a wireless communication device having at least two subscriptions. The first subscription may be designated as a Default Data Subscription (DDS) and the second subscription may be designated as a non-DDS. Given that the second subscription may be used for VoLTE, VT, and SMS services, the wireless communication device may be configured to disallow traffic other than VoLTE, VT, and SMS communications on the second subscription by indicating to the network that services than VoLTE, VT, and SMS may undesired or unsupported by the wireless communication device.

For example, the wireless communication device may deactivate all Packet Data Networks (PDNs) for the second subscription except the Internet Protocol (IP) Multimedia Subsystem (IMS) PDN. The deactivated PDNs may include at least an Internet PDN. The wireless communication device may send an indication message (e.g., an Over-the-Air (OTA) signaling message) to the network indicating that PDNs other than the IMS PDN have been deactivated for the second subscription. As a result, the network may no longer transmit non-IMS pages to the wireless communication device. Accordingly, all pages received by the wireless communication device may relate to IMS services. The wireless communication device may decode and respond to all pages received from the network of the second subscription, given that all pages would be related to IMS services. The number of total pages received by the wireless communication device from the network of the second subscription can be significantly reduced.

In addition, the wireless communication device may de-register specific service types of the IMS PDN. For example, the wireless communication device may de-register all IMS services for the second subscription except for one or more of the VoLTE, VT, or SMS services. Examples of de-registered IMS services may include Rich Communication Services (RCS), File To Protocol (FTP) services, video sharing services, and the like. In particular, the wireless communication device may send an indication message (e.g., an Over-the-Air (OTA) signaling message) to an IMS core network associated with the second subscription to indicate that IMS services other than VoLTE, VT, and SMS on the second subscription are not enabled or supported. As a result, the IMS core network of the second subscription may send Session Initiation Protocol (SIP) packets (or other types of communications) for VoLTE, VT, and SMS only. The SIP is a protocol for signaling multimedia control sessions. The SIP packets associated with VoLTE, VT, and SMS may include INVITE and MESSAGE. INVITE is a request to establish a media session. MESSAGE is a request to or a response from the server supporting the IMS core network.

Accordingly, embodiments described herein can increase data throughput for the first subscription and conserve power by avoiding unnecessary processes in response to irrelevant (non-VoLTE/VT/SMS) second-subscription communications.

Various embodiments may be implemented within a communication system 100, an example of which is illustrated in FIG. 1. Referring to FIG. 1, a first mobile network 102 and a second mobile network 104 may each associate with a plurality of cellular base stations (e.g., a first base station 130 and a second base station 140, respectively). The first base station 130 may broadcast the first mobile network 102 in a first serving cell 150. The second base station 140 may broadcast the second mobile network 104 in a second serving cell 160. Illustrating with a non-limiting example, one or more of the first mobile network 102 and the second mobile network 104 may be associated with one or more of an IMS PDN, internet PDN, and/or the like. A wireless communication device 110 may be associated with (within effective boundaries of) both the first serving cell 150 and the second serving cell 160.

The wireless communication device 110 may be in communication with the first mobile network 102 through a first cellular connection 132 to the first base station 130. The first cellular connection 132 may correspond to the first RAT of the wireless communication device 110. The wireless communication device 110 may also be in communication with the second mobile network 104 through a second cellular connection 142 to the second base station 140. The second cellular connection 142 may correspond to the second RAT of the wireless communication device 110, as in a multi-SIM context. The first base station 130 may be in communication with the first mobile network 102 over a wired or wireless connection 134. The second base station 140 may be in communication with the second mobile network 104 over a wired or wireless connection 144.

The first cellular connection 132 and the second cellular connection 142 may be made through two-way wireless communication links. Each of the wireless communication links may be enable by any suitable protocol including, but not limited to, FDMA, TDMA, CDMA (e.g., EVDO), UMTS (e.g., WCDMA, LTE, HSDPA, or the like), GSM, 1x, GPRS, Wi-Fi, PCS, and/or another protocol used in a wireless communications network or a data communications network. By way of illustrating with a non-limiting example, the first cellular connection 132 may be an LTE connection. The second cellular connection 142 may be an LTE connection. Other RATs (such as, but not limited to, WCDMA, HSDPA, EVDO, and the like) may be implemented in a similar manner. In some embodiments, the first cellular connection 132 and the second cellular connection 142 may be association with a same RAT.

Each of the first base station 130 and the second base station 140 may include at least one antenna group or transmission station located in the same or different areas. The at least one antenna group or transmission station may be associated with signal transmission and reception. Each of the first base station 130 and the second base station 140 may include one or more processors, modulators, multiplexers, demodulators, demultiplexers, antennas, and the like for performing the functions described herein. In some embodiments, the first base station 130 and the second base station 140 may be an access point, Node B, evolved Node B (eNodeB or eNB), base transceiver station (BTS), or the like.

In various embodiments, the wireless communication device 110 may be configured to access the first mobile network 102 and the second mobile network 104 by virtue of the multi-SIM and/or the multi-mode SIM configuration of the wireless communication device 110 (e.g., via the first cellular connection 132 and the second cellular connection 142). When a SIM corresponding to a RAT is inserted, the wireless communication device 110 may access the mobile communication network associated with that RAT based on the information stored on the SIM through registrations and call setups, as described herein.

While the wireless communication device 110 is shown connected to the mobile networks 102 and 104 via two cellular connections, in other embodiments (not shown), the wireless communication device 110 may establish additional network connections using at least one additional RAT.

In some embodiments, the wireless communication device 110 may establish a wireless connection with a peripheral device (not shown) used in connection with the wireless communication device 110. For example, the wireless communication device 110 may communicate over a Bluetooth® link with a Bluetooth-enabled personal computing device (e.g., a "smart watch"). In some embodiments, the wireless communication device 110 may establish a wireless connection with a wireless access point (not shown), such as over a Wi-Fi connection. The wireless access point may be configured to connect to the Internet or another network over a wired connection.

Figure 2:
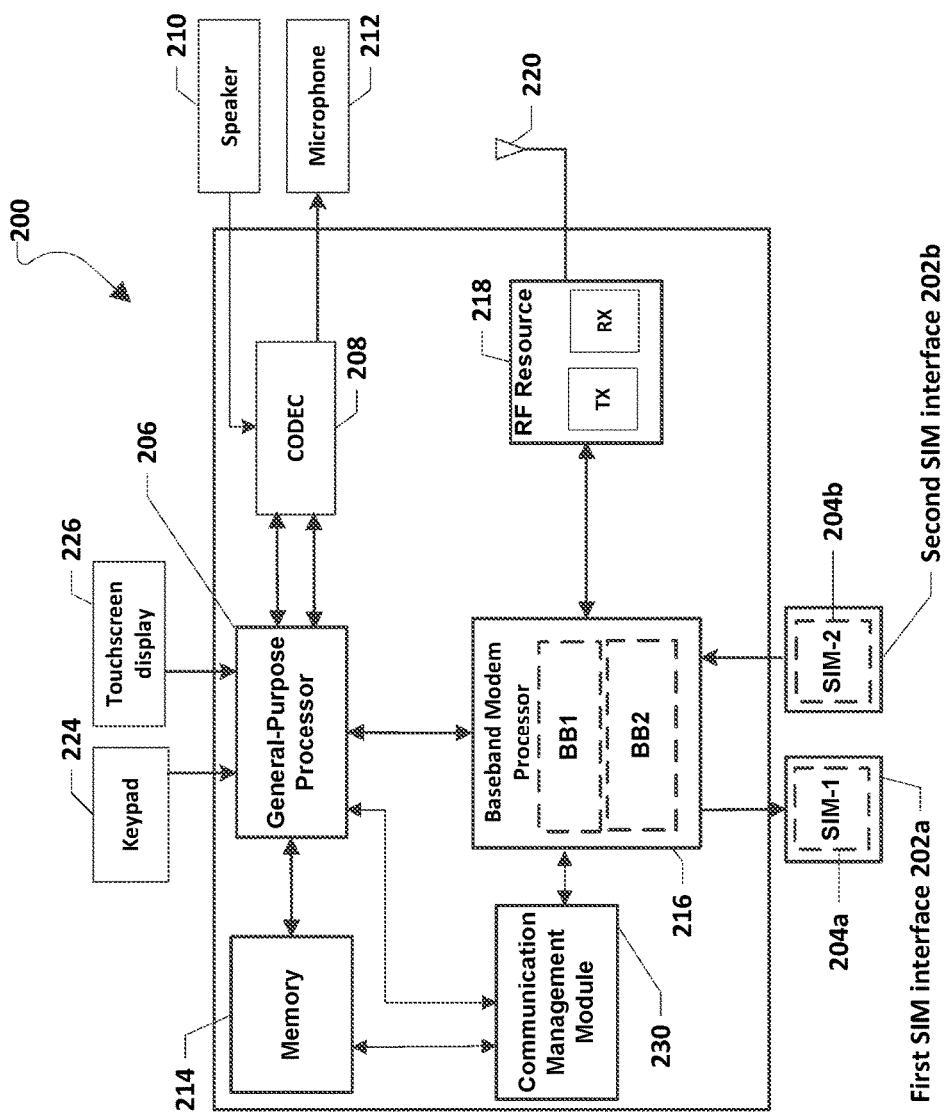
FIG. 2 is a component block diagram of an example of a wireless communication device according to various embodiments.

FIG. 2 is a functional block diagram of a wireless communication device 200 suitable for implementing various embodiments. According to various embodiments, the wireless communication device 200 may be the wireless communication device 110 as described with reference to FIG. 1. Referring to FIGS. 1-2, the wireless communication device 200 may include a first SIM interface 202a, which may receive a first identity module SIM-1 204a that is associated with the first mobile network 102. The wireless communication device 200 may also include a second SIM interface 202b, which may receive a second identity module SIM-2 204b that is associated with the second mobile network 104.

A SIM (e.g., SIM-1 204a, SIM-2 204b, and/or the like) in various embodiments may be a Universal Integrated Circuit Card (UICC) that is configured with SIM and/or Universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (ICCID) SIM serial number may be printed on the SIM card for identification. However, a SIM may be implemented within a portion of memory of the wireless communication device 200, and thus need not be a separate or removable circuit, chip, or card.

A SIM used in various embodiments may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may be a non-transitory processor-readable storage medium that stores processor-executable instructions. For example, the instructions may include routing communication data relating to the first or second subscription though a corresponding baseband-RF resource chain. The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to baseband modem processor 216. The SIMs (e.g., the SIM-1 204a, the SIM-2 204b, and/or the like) in the wireless communication device 200 may be associated with at least one baseband-RF resource chain. A baseband-RF resource chain may include the baseband modem processor 216, which may perform baseband/modem functions for communications on the SIMs. The baseband modem processor 216 may include one or more amplifiers and radios, referred to generally herein as a RF resource 218 or RF chain.

The embodiments described herein may be applicable to wireless communication devices in which the SIMs 204a and 204b share a common set of RF resource (particularly, the RF resource 218). Embodiments described herein may also be applicable to wireless communication devices in which each of the SIMs 204a and 204b has a separate RF resource, but activities of one of the SIMs 204a and 204b may be deactivated while the other one of the SIMs 204a and 204b is active.

The RF resource 218 may include at least one transceiver that perform transmit/receive functions for the associated SIMs 204a and 204b of the wireless communication device 200. The RF resource 218 may include separate transmit and receive circuitry, or may include a transceiver that combines transmitter and receiver functions. The RF resource 218 may be coupled to a wireless antenna 220. The RF resource 218 may also be coupled to the baseband modem processor 216.

In some embodiments, the general-purpose processor 206, the memory 214, the baseband modem processor 216, and the RF resource 218 may be included in the wireless communication device 200 as a system-on-chip. In some embodiments, the SIMs 204a and 204b and their corresponding interfaces 202a, 202b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them.

The wireless communication device 200 may include a communication management module 230. The communication management module 230 may configure the wireless communication device 200 to deactivate one or more PDNs (associated with the second subscription (e.g., SIM-2 204b)) with the second mobile network 104. In some embodiments, the communication management module 230 may configure the wireless communication device 200 to deactivate one or more services of the IMS PDN associated with the second subscription (e.g., SIM-2 204b) with the second mobile network 104.

In some embodiments, the communication management module 230 may be implemented within the general-purpose processor 206. For example, the communication management module 230 may be implemented as a software application stored within the memory 214 and executed by the general-purpose processor 206. Accordingly, such embodiments can be implemented with minimal additional hardware costs. However, other embodiments relate to systems and processes implemented with dedicated hardware specifically configured for performing operations described herein with respect to the communication management module 230. For example, the communication management module 230 may be implemented as a separate processing component (i.e., separate from the general-purpose processor 206). The communication management module 230 may be coupled to the memory 214, the general processor 206, the baseband processor 216, and/or the RF resource 218 for performing the function described herein.

Hardware and/or software for the functions may be incorporated in the wireless communication device 200 during manufacturing, for example, as a part of a configuration of an original equipment manufacturer (OEM) of the wireless communication device 200. In further embodiments, such hardware and/or software may be added to the wireless communication device 200 post-manufacture, such as by installing one or more hardware devices and/or software applications onto the wireless communication device 200.

In some embodiments, the wireless communication device 200 may include, among other things, additional SIM cards, SIM interfaces, at least another RF resource associated with the additional SIM cards, and additional antennas for connecting to additional mobile networks.

Figure 3:
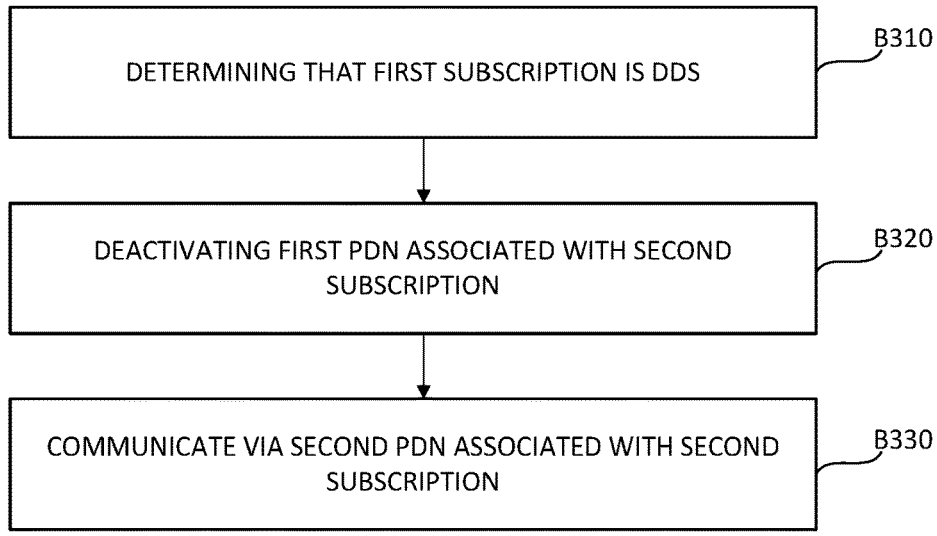
FIG. 3 is a process flowchart diagram illustrating an example of a communication management method according to various embodiments.

FIG. 3 is a process flowchart diagram illustrating an example of a communication management method 300 according to various embodiments. Referring to FIGS. 1-3, in some embodiments, the communication management module 230 or the general-purpose processor 206 may determine that the first subscription (associated with a first SIM, SIM-1 204a) is a DDS. In some embodiments, the communication management module 230 or the general-purpose processor 206 may automatically assign the first subscription to be the DDS. Illustrating with a non-limiting example, the communication management module 230 or the general-purpose processor 206 may assign the first subscription to be the DDS in response to determining that the two or more subscriptions are associated with a same RAT (e.g., LTE). In some embodiments, the communication management module 230 or the general-purpose processor 206 may assign the first subscription to be the DDS based on suitable user input (e.g., via the keypad 224, touchscreen display 226, microphone 212, and/or the like).

The first subscription being determined to be the DDS indicates that the second subscription (associated with a second SIM, SIM-2 204b) is not the DDS, given that one of the subscriptions can be the DDS at a given time. The communication management module 230 or the general-purpose processor 206 may determine that the second subscription is a non-DDS in response to the communication management module 230 or the general-purpose processor 206 assigning the first subscription to be the DDS.

At block B320, the communication management module 230 or the general-purpose processor 206 may deactivate at least one first PDN associated with the second subscription in some embodiments. The second subscription may be associated with one or more PDNs, including at least one first PDN and at least one second PDN. Examples of the at least one first PDN may include, but not limited to, the Internet PDN. Examples of the at least one second PDN may include, but not limited to, the IMS PDN.

In some embodiments, the communication management module 230 or the general-purpose processor 206 may deactivate the at least one first PDN in response to determining that the first subscription is the DDS. In some embodiments, the communication management module 230 or the general-purpose processor 206 may deactivate the at least one first PDN in response to determining that the second subscription is not the DDS.

The communication management module 230 or the general-purpose processor 206 may deactivate at least one first PDN associated with the second subscription by configuring one or more of the baseband modem processor 216, RF resource 218, antenna 220, and/or the like to transmit at least one first indication message to the second mobile network 104 to indicate that the at least one first PDN associated with the second subscription is deactivated. In some embodiments, the first indication message may be an OTA signaling message.

The OTA signaling message may include a PDN deactivate OTA signaling message, which includes one or more of an Evolved Packet-Switched System (EPS) bearer identification, deactivate EPS bearer context request, and/or the like. The deactivate EPS bearer context request may request the network (e.g., the second mobile network 104) associated with the second subscription to not establish with the wireless communication device 200 any communication sessions (e.g., an EPS bearer session) for the second subscription. The second mobile network 104 may send a deactivate EPS bearer context acceptance message to the wireless communication device 200 to indicate acceptance of the deactivate EPS bearer context request.

At block B330, the communication management module 230 or the general-purpose processor 206 may configure one or more of the baseband modem processor 216, RF resource 218, antenna 220, and the like to communicate with the second mobile network 104 via the at least one second PDN associated with the second subscription. The at least one second PDN may include the IMS PDN.

The communication management module 230 or the general-purpose processor 206 may configure one or more of the baseband modem processor 216, RF resource 218, antenna 220, and the like to send a PDN activate OTA signaling message to the second mobile network 104 to set up communication via the at least one second PDN. The PDN activate OTA signaling message may include one or more of attach request message, EPS mobility management messages, attach request/acceptance, combined EPS and IMSI attach, EPS session management messages, PDN connectivity request, voice, centric, IMS voice domain preference, location services, emergency bearer, IMS voice PS session message, and PDN connectivity request.

Communicating via the at least one second PDN may include receiving, decoding, and responding pages of the at least one second PDN in some embodiments. Communicating via the at least one second PDN may additionally or alternatively include receiving, decoding, and responding session requests, call requests, and other messages/signals for the at least one second PDN. The wireless communication device 200 may not receive any pages, session requests, call requests, or other messages/signals for the at least one first PDN given that the at least one first PDN have been deactivated at block B320.

Figure 4:
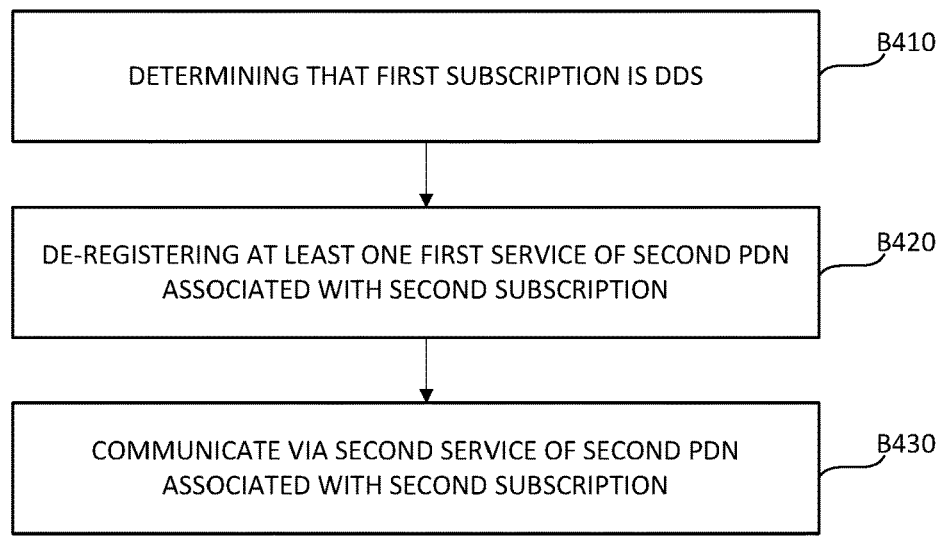
FIG. 4 is a process flowchart diagram illustrating an example of a communication management method according to various embodiments.

FIG. 4 is a process flowchart diagram illustrating an example of a communication management method 400 according to various embodiments. Referring to FIGS. 1-4, in some embodiments, the communication management module 230 or the general-purpose processor 206 may determine that the first subscription (associated with a first SIM, SIM-1 204a) is a DDS in a manner such as, but not limited to, described with respect to block B310.

At block B420, the communication management module 230 or the general-purpose processor 206 may de-register at least one first service of the second PDN associated with the second subscription in some embodiments. In some embodiments, the at least one first service of the second PDN may be de-registered in response to or simultaneous with the first PDN being deactivated (e.g., at block B320). In some embodiments, the at least one first service of the second PDN may be de-registered in response to determining that the first subscription is a DDS (or in response to determining that the second subscription is a non-DDS).

The at least one first service of the second PDN may include, but not limited to, RCS, FTP, video sharing services, and/or other similar non-mandatory services of the like. The second PDN may include the at least one first service and the at least one second service. In some embodiments, the communication management module 230 or the general-purpose processor 206 may automatically select the at least one first service of the second PDN to be de-registered. In some embodiments, the communication management module 230 or the general-purpose processor 206 may de-register the at least one first service based on suitable user input (e.g., via the keypad 224, touchscreen display 226, microphone 212, and/or the like.

The communication management module 230 or the general-purpose processor 206 may de-register at least one first service of the second PDN associated with the second subscription by configuring one or more of the baseband modem processor 216, RF resource 218, antenna 220, and/or the like to transmit at least one second indication message to the second mobile network 104 to indicate that the at least one first service of the second PDN is to be de-registered at the second mobile network 104. In some embodiments, the second indication message may be an OTA signaling message.

In some embodiments, the OTA signaling message may include registration message indicating that the at least one second service of the second PDN may be registered. The at least one first service of the second PDN may not be included or otherwise represented in the OTA signaling message. In some embodiments, the OTA signaling message may indicate that the first service of the second PDN is to be de-registered if the first service had already been registered.

At block B430, the communication management module 230 or the general-purpose processor 206 may configure one or more of the baseband modem processor 216, RF resource 218, antenna 220, and the like to communicate with the second mobile network 104 via the at least one second service of the second PDN associated with the second subscription. The at least one second service may include one or more of VoLTE services, VT services, SMS services, and/or other similar mandatory services of the like.

The communication management module 230 or the general-purpose processor 206 may configure one or more of the baseband modem processor 216, RF resource 218, antenna 220, and the like to set up sessions corresponding to the at least one second service of the second PDN by, for example, sending the OTA signaling message as described. Communicating via the at least one second service of the second PDN may include receiving, decoding, and responding to the SIP packets sent by the second mobile network 104. The SIP packets may be used to set up calls and other suitable services via the at least one second service of the second PDN. The SIP packets may include INVITE and MESSAGE types of signal messages. Pages or other communications related to the at least one first service of the second PDN may not be received.

Figure 5:
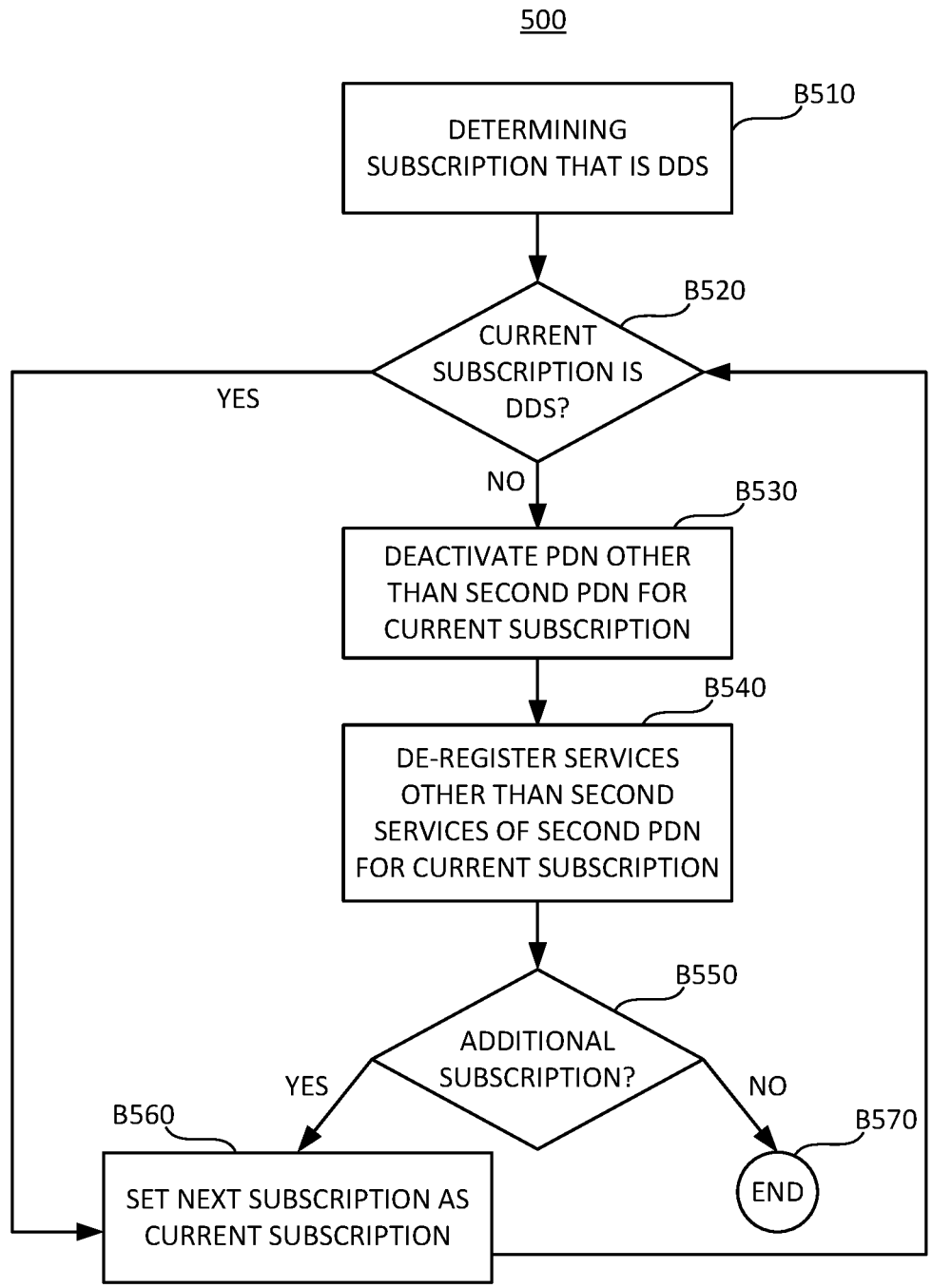
FIG. 5 is a process flowchart diagram illustrating an example of a communication management method according to various embodiments.

FIG. 5 is a process flowchart diagram illustrating an example of a communication management method 500 according to various embodiments. Referring to FIGS. 1-5, in some embodiments, one of more of blocks B510-B570 may correspond to one or more of blocks B310-B330 and/or blocks B410-B430. In some embodiments, the communication management module 230 or the general-purpose processor 206 may determine which subscription of the wireless communication device 200 is the DDS at block B510. Illustrating with a non-limiting example, the first subscription may represent the DDS subscription, and the second subscription may represent the non-DDS subscription. Given that the first subscription has been determined to be the DDS, any subscription other than the first subscription may be a non-DDS.

At block B520, the communication management module 230 or the general-purpose processor 206 may determine whether a current subscription is the DDS in some embodiments. For example, if the current subscription is the first subscription, then the current subscription is the DDS. If the current subscription is the second subscription, then the current subscription is non-DDS.

In some embodiments, in response to determining that the current subscription is the DDS (e.g., when the current subscription is the first subscription) (B520: YES), the communication management module 230 or the general-purpose processor 206 may set the next subscription (e.g., the second subscription) to be the current subscription, at block B560. Then, the communication management module 230 or the general-purpose processor 206 may determine whether the current subscription (e.g., the second subscription) is the DDS, at block B520.

In some embodiments, in response to determining that the current subscription is not the DDS (e.g., when the current subscription is the second subscription) (B520: NO), the communication management module 230 or the general-purpose processor 206 may deactivate at least one PDN (e.g., the at least one first PDN) other than the second PDN for the current subscription, at block B530. Illustrating with a non-limiting example, the communication management module 230 or the general-purpose processor 206 may deactivate the at least one PDN other than the second PDN in a manner such as, but not limited to, described with respect to block B320.

At block B540, the communication management module 230 or the general-purpose processor 206 may de-register at least one service (e.g., the at least one first service) other than the second service of the second PDN for the current subscription in some embodiments. Illustrating with a non-limiting example, the communication management module 230 or the general-purpose processor 206 may de-register the at least one service other than the second service in a manner such as, but not limited to, described with respect to block B420. The blocks B530 and B540 may be executed simultaneously or in any suitable sequential order.

At block B550, the communication management module 230 or the general-purpose processor 206 may determine whether there is at least one additional subscription that has not been processed in some embodiments. In response to determining that there is at least one additional subscription (B550: YES), the communication management module 230 or the general-purpose processor 206 may set the additional (next) subscription as the current subscription at block B560. Then, the communication management module 230 or the general-purpose processor 206 may perform block B520 with the additional (next) subscription as the current subscription. On the other hand, when the wireless communication device 200 has no additional subscription that has not been processed (B550: NO), then the method 500 ends at block B570.

Figure 6:
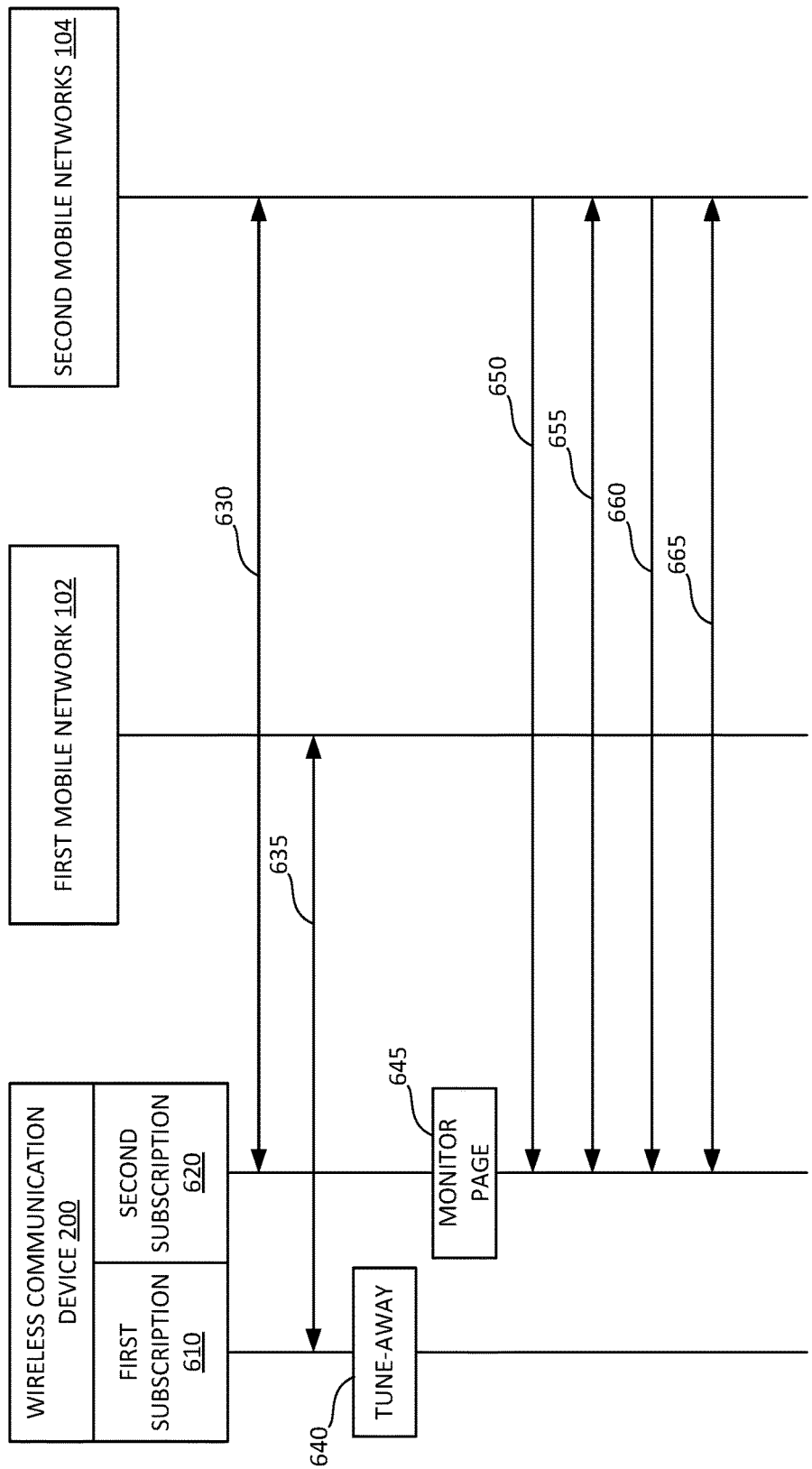
FIG. 6 is a signaling diagram illustrating an example of communications between the wireless communication device and one or more of the first mobile network and the second mobile network according to various embodiments.

FIG. 6 is a signaling diagram illustrating an example of communications between the wireless communication device 200 and one or more of the first mobile network 102 and the second mobile network 104 according to various embodiments. In some embodiments, the wireless communication device 200 may have at least a first subscription 610 (corresponding to the SIM-1 204a) and a second subscription 620 (corresponding to the SIM-2 204b). The wireless communication device 200 may be linked to the first mobile network 102 for the first subscription 610. The wireless communication device 200 may be linked with the second mobile network 104 for the second subscription 620.

At signaling block 630, the communication management module 230 or the general-purpose processor 206 may configure one or more of the baseband modem processor 216, RF resource 218, antenna 220 to register the second services (e.g., VoLTE, VT, and/or SMS services) over the second PDN (e.g., the IMS PDN) associated with the second subscription 620. In some embodiments, the communication management module 230 or the general-purpose processor 206 may configure one or more of the baseband modem processor 216, RF resource 218, antenna 220 to deactivate the at least one first PDN (e.g., the Internet PDN). At signaling block 630, Packet Switching (PS) may be suspended.

At signaling block 635, the first subscription 610 may be PS-connected with the first mobile network 102 by the communication management module 230 or the general-purpose processor 206 in some embodiments.

At signaling block 640, the communication management module 230 or the general-purpose processor 206 may configure one or more of the baseband modem processor 216, RF resource 218, antenna 220 to tune away from the first subscription 610 to the second subscription 620. In other words, PS for the first subscription may be suspended.

At signaling block 645, the communication management module 230 or the general-purpose processor 206 may configure one or more of the baseband modem processor 216, RF resource 218, antenna 220 to monitor communication (e.g., pages) for the second subscription 620 in some embodiments.

At signaling block 650, the communication management module 230 or the general-purpose processor 206 may configure one or more of the baseband modem processor 216, RF resource 218, antenna 220 to receive pages for the second subscription 620 from the second mobile network 104. The pages may include at least one second service for the second PDN associated with the second subscription 620. Pages for the first services for the second PDN or pages for the first PDN may not be received by the wireless communication device 200 given that the first services and the first PDN may be deactivated or de-registered as described.

At signaling block B655, the communication management module 230 or the general-purpose processor 206 may configure one or more of the baseband modem processor 216, RF resource 218, antenna 220 to establish a Radio Resource Control (RRC) connection with the second mobile network 104 in some embodiments. At signaling block B660, the communication management module 230 or the general-purpose processor 206 may configure one or more of the baseband modem processor 216, RF resource 218, antenna 220 to receive incoming packets from the second mobile network 104. The incoming packets may be associated with the second service of the second PDN associated with the second subscription 620.

At signaling block B665, the communication management module 230 or the general-purpose processor 206 may configure one or more of the baseband modem processor 216, RF resource 218, antenna 220 to establish the at least one second services for the second PDN. For example, a voice call over VoLTE may be established.

Figure 7:
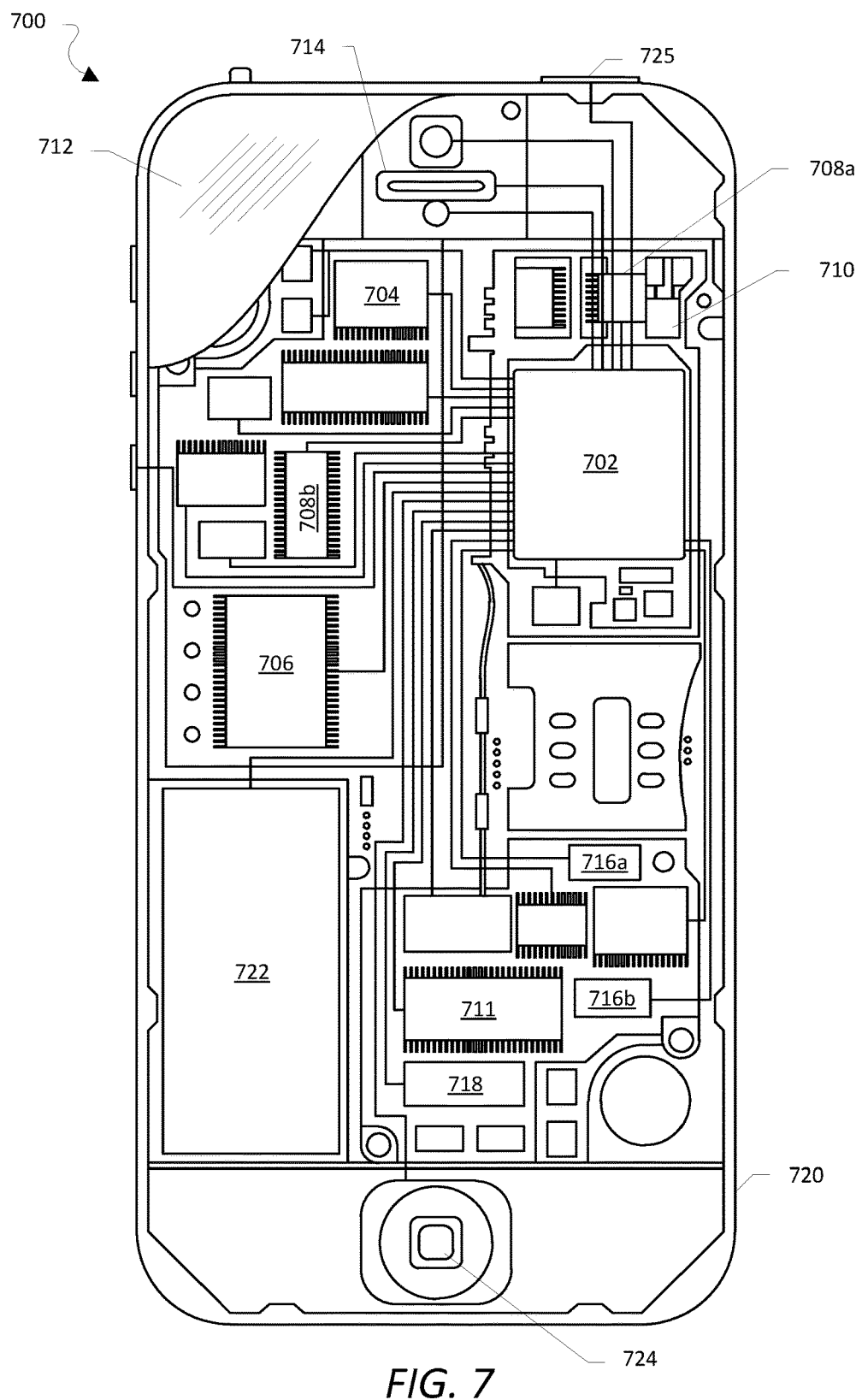
FIG. 7 is a component block diagram of a wireless communication device suitable for use with various embodiments.

The various embodiments may be implemented in any of a variety of wireless communication devices 110 and 200, an example of which is illustrated in FIG. 7, as wireless communication device 700. As such, the wireless communication device 700 may implement the process and/or the apparatus of FIGS. 1-6, as described herein.

With reference to FIGS. 1-7, the wireless communication device 700 may include a processor 702 coupled to a touchscreen controller 704 and an internal memory 706. The processor 702 may be one or more multi-core integrated circuits designated for general or specific processing tasks. The memory 706 may be volatile or non-volatile memory, and may also be secure and/or encrypted memory, or unsecure and/or unencrypted memory, or any combination thereof. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the wireless communication device 700 need not have touch screen capability.

The wireless communication device 700 may have one or more cellular network transceivers 708*a*, 708*b* coupled to the processor 702 and to at least one antenna 710 and configured for sending and receiving cellular communications. The transceivers 708*a*, 708*b* and antenna 710 may be used with the above-mentioned circuitry to implement the various embodiment methods. The cellular network transceivers 708*a*, 708*b* may be the RF resource 218. The antenna 710 may be the antenna 220. The wireless communication device 700 may include two or more SIM cards 716*a*, 716*b*, corresponding to SIM-1 204*a* and SIM-2 204*b*, coupled to the transceivers 708*a*, 708*b* and/or the processor 702. The wireless communication device 700 may include a cellular network wireless modem chip 711 (e.g., the baseband modem processor 216) that enables communication via at least one cellular network and is coupled to the processor 702.

The wireless communication device 700 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe. The peripheral device connection interface 718 may also be coupled to a similarly configured peripheral device connection port (not shown).

The wireless communication device 700 may also include speakers 714 for providing audio outputs. The wireless communication device 700 may also include a housing 720, constructed of a plastic, metal, or a combination of materials, for containing all or some of the components discussed herein. The wireless communication device 700 may include a power source 722 coupled to the processor 702, such as a disposable or rechargeable battery. The rechargeable battery may also be coupled to a peripheral device connection port (not shown) to receive a charging current from a source external to the wireless communication device 700. The wireless communication device 700 may also include a physical button 724 for receiving user inputs. The wireless communication device 700 may also include a power button 726 for turning the wireless communication device 700 on and off.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to some embodiments without departing from the spirit or scope of the embodiments. Thus, the present embodiments are not intended to be limited to the embodiments shown herein but is to be accorded the widest scope consistent with the following claims and the principles and novel features disclosed herein.

What is claimed is:

1. A method of managing communications for a wireless communication device having a first Subscriber Identity Module (SIM) associated with a first subscription and a second SIM associated with a second subscription, the method comprising:
   determining that the first subscription is a Default Data Subscription (DDS);
   in response to determining that the first subscription is a DDS, deactivating all Packet Data Networks (PDNs) associated with the second subscription except for a first network, wherein the first network is an Internet Protocol (IP) Multimedia Subsystem (IMS) Packet Data Network (PDN);
   de-registering, for the first network, all IMS services except for a first service selected from the group consisting of Voice-Over-LTE (VoLTE) services, Video Technology (VT) services, and Short Messaging Services (SMS) services; and
   communicating via the first network using the first service.

2. The method of claim 1, wherein deactivating all (PDNs) associated with the second subscription except for the first network comprises sending an indication message to network indicating that all PDNs associated with the second subscription except for the first network are deactivated.

3. The method of claim 2, wherein the indication message is an Over-the-Air (OTA) signaling message.

4. The method of claim 1, wherein communicating via the first network associated with the second subscription comprises receiving pages for the first network associated with the second subscription.

5. The method of claim 1, wherein de-registering services of the first network comprises sending an indication message to a network indicating that all IMS services except the first service are deactivated.

6. The method of claim 5, wherein the indication message is an Over-the-Air (OTA) signaling message.

7. The method of claim 1, wherein communicating via the first network comprises receiving Session Initiation Protocol (SIP) packets.

8. The method of claim 1, wherein:
   the first subscription is a Long Term Evolution (LTE) subscription; and
   the second subscription is a LTE subscription.

9. The method of claim 1, wherein the wireless communication device is a Multi-SIM-Multi-Standby (MSMS) device.

10. The method of claim 1, wherein the de-registered IMS services allow a non-mandatory service.

11. The method of claim 10, wherein the non-mandatory service is at least one from the group consisting of Rich Communication Services (RCS), File-To-Protocol, and video sharing services.

12. The method of claim 1, wherein the communicating comprises only receiving mandatory traffic from the first network.

13. A wireless communication device, comprising:
at least one radio frequency (RF) resource;
a first Subscriber Identity Module (SIM) associated with a first subscription;
a second SIM associated with a second subscription;
a processor; and
a memory storing instructions that, when executed by the processor, cause the wireless communication device to:
determine that the first subscription is a Default Data Subscription (DDS);
in response to a determination that the first subscription is a DDS, deactivate all Packet Data Networks (PDNs) associated with the second subscription except for a first network, wherein the first network is an Internet Protocol (IP) Multimedia Subsystem (IMS) PDN;
de-register, for the first network, all IMS services except for a first service selected from the group consisting of Voice-Over-LTE (VoLTE) services, Video Technology (VT) services, and Short Messaging Services (SMS) services; and
communicate via the first network using the first service.

14. The wireless communication device of claim 13, wherein execution of instructions to deactivate all PDNs associated with the second subscription except for the first network causes the wireless communication device to further:
send an indication message to a network indicating that all PDNs associated with the second subscription except for the first network are deactivated.

15. The wireless communication device of claim 14, wherein the indication message is an Over-the-Air (OTA) signaling message.

16. The wireless communication device of claim 13, wherein execution of the instructions to communicate via the first network causes the wireless communication device to further:
receive pages for the first network associated with the second subscription.

17. The wireless communication device of claim 13, wherein execution of the instructions to de-register all IMS services of the first network except for the first service causes the wireless communication device to further:
send an indication message to a network indicating that all IMS services except the first service are deactivated.

18. The wireless communication device of claim 17, wherein the indication message is an Over-the-Air (OTA) signaling message.

* * * * *